United States Patent [19]

Szymski

[11] Patent Number: 4,772,069
[45] Date of Patent: Sep. 20, 1988

[54] LONGITUDINALLY ADJUSTABLE SADDLE MOUNTING FOR CYCLE-TYPE APPARATUS

[75] Inventor: Eugene J. Szymski, Skokie, Ill.

[73] Assignee: Schwinn Bicycle Company, Chicago, Ill.

[21] Appl. No.: 137,600

[22] Filed: Dec. 24, 1987

[51] Int. Cl.$^4$ ............................................. B62J 1/00
[52] U.S. Cl. .................................. 297/195; 297/214; 297/311
[58] Field of Search ............... 297/195, 203, 214, 317, 297/311; 248/424, 429

[56] References Cited

U.S. PATENT DOCUMENTS

| | | | |
|---|---|---|---|
| 2,066,557 | 1/1937 | Cox | 248/429 |
| 4,150,851 | 4/1979 | Cienfuegos | 297/195 |

FOREIGN PATENT DOCUMENTS

| | | | |
|---|---|---|---|
| 209202 | 5/1960 | Austria | 297/195 |
| 328506 | 8/1903 | France | 297/195 |

Primary Examiner—James T. McCall
Attorney, Agent, or Firm—McCaleb, Lucas & Brugman

[57] ABSTRACT

A longitudinally adjustable saddle mounting for cycle-type apparatus such as a cycle-type exerciser, a bicycle, a tricycle, or like apparatus having a saddle mounted on a seat post. The saddle is fastened to a slide member which is adjustably moveable lengthwise of a channel guide member mounted on the seat post. A latch pin is carried by the slide member and is spring-biased toward a locked position engaging a selected one of several detent recesses in the channel guide member. A gudgeon member is rotatably journaled in the slide member and has an external handle. Interengaging grooves on the gudgeon member and latch pin move the pin from its locked position when the handle is turned, enabling longitudinal adjustment of the saddle with the slide member.

11 Claims, 2 Drawing Sheets

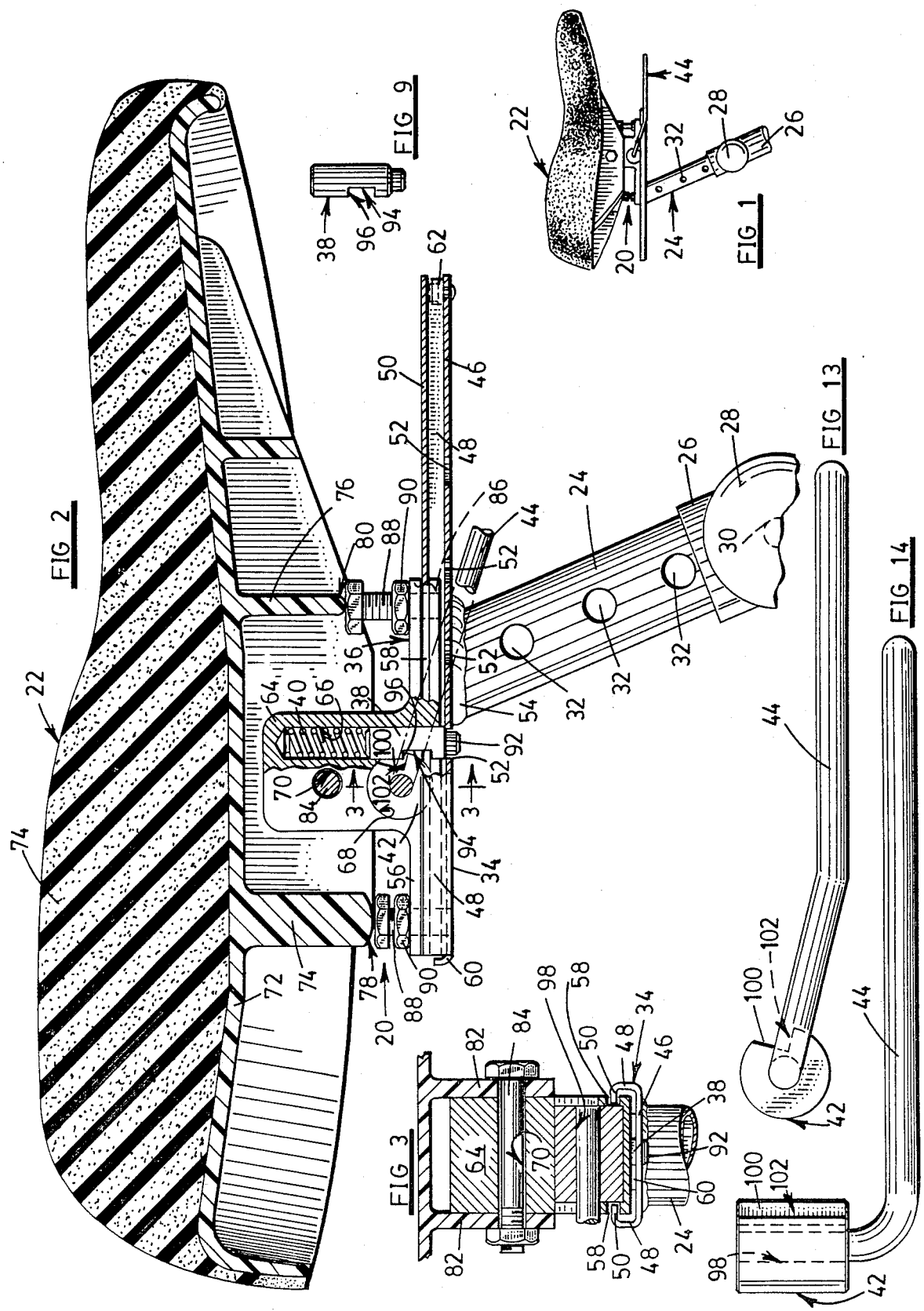

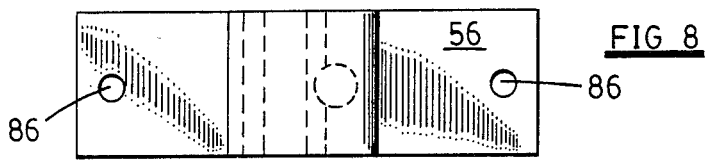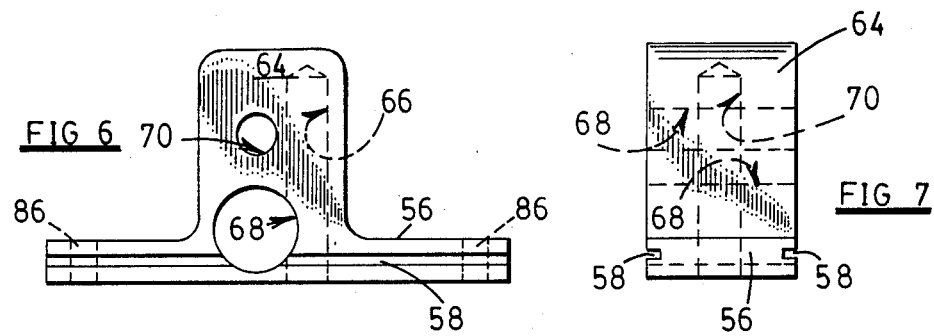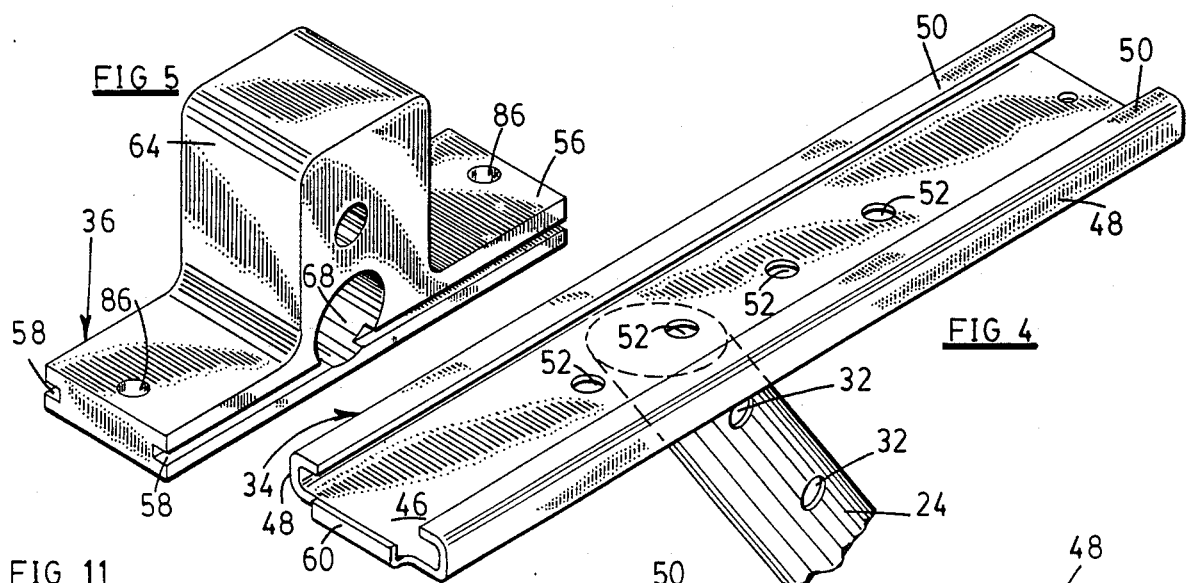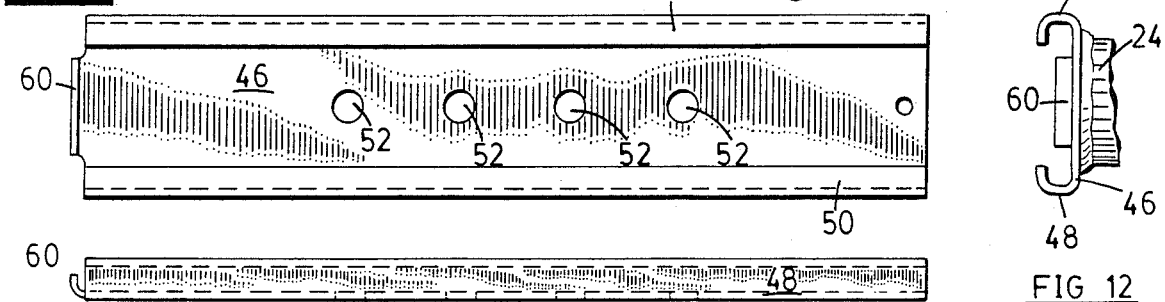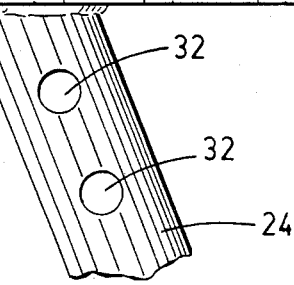

LONGITUDINALLY ADJUSTABLE SADDLE MOUNTING FOR CYCLE-TYPE APPARATUS

BACKGROUND OF THE INVENTION

This invention relates generally to a cycle-type apparatus such as an exerciser, a bicycle, or a tricycle, and it relates particularly to a longitudinally adjustable saddle mounting.

A single cycle-type exerciser typically will be used by a family or group of people whose requirements for saddle height and saddle longitudinal position may vary widely.

Saddle height adjustment is conventionally made easily and rapidly by mechanism such as a quick-release clamp at the top of the seat mast, or an adjustment knob having a pin extending through matching holes in the seat mast and seat tube.

No such easily and rapidly adjustable mechanism is available for varying the longitudinal position of the seat. As a result, many users simply accommodate themselves to a less than optimum fore-and-aft position of the saddle, and may consciously or unconsciously reduce their exercise time to compensate for a less-than-optimum saddle position.

SUMMARY OF THE INVENTION

Accordingly, the primary purpose of the present invention is to provide a simple mechanism for easily and rapidly adjusting the longitudinal position of a saddle from one positively latched position to another.

Another purpose is to provide such a longitudinally-adjustable saddle mechanism which can be retrofitted into the tubular seat mast of most bicycle, tricycle and cycle exerciser frames without altering the frame construction with special bolts, clamps, outside springs, or drilled holes.

Another purpose is to provide such a longitudinally-adjustable mechanism which has a standard saddle mounting and which can be substituted for a standard seat post, without making any structural changes in the tubular seat mast.

BRIEF DESCRIPTION OF THE DRAWINGS

Other objects and advantages will be apparent from the following description taken in conjunction with the drawings in which:

FIG. 1 is a fragmentary side view of a seat mast for a cycle exerciser with a longitudinally adjustable saddle mounting illustrating one embodiment of the present invention;

FIG. 2 is an enlarged, partially-sectioned view of FIG. 1;

FIG. 3 is a cross-section of FIG. 3 taken on line 3—3;

FIG. 4 is a perspective view of a major component of the invention, namely, a stationary, elongated channel guide member mounted on a seat post;

FIG. 5 is a perspective view of another major component of the invention, namely, a slide member;

FIG. 6 is a side elevational view of the slide member shown in FIG. 5;

FIG. 7 is an end view of FIG. 6;

FIG. 8 is a top view of FIG. 6;

FIG. 9 is a side view of a latch pin member;

FIG. 10 is a side elevational view of the channel guide member and seat post shown in FIG. 4;

FIG. 11 is a top view of FIG. 10;

FIG. 12 is an end view of FIG. 11;

FIG. 13 is an enlarged side view of the gudgeon member and handle which are partly shown in FIG. 2; and FIG. 14 is a top view of FIG. 13.

Like parts are referred to by like reference numerals.

DESCRIPTION OF THE PREFERRED EMBODIMENT

Referring now to the drawings, a longitudinally adjustable mounting illustrating the invention is generally designated 20. It supports a saddle 22, a seat post 24 telescopically mounted for vertical adjustment in a seat mast 26 which may be a frame component of a cycle exerciser, bicycle, or tricycle, or like apparatus. As best shown in FIGS. 1 and 2, the vertical position is determined by a conventional adjustment knob 28 threadedly secured to the upper end of the seat mast and having a pin 30 engaging selected matching holes 32 in the seat post 24.

The longitudinally adjustable mounting 20 comprises a stationary, elongated channel guide member 34, an elongated slide member 36, a latch pin 38, a biasing spring 40, and a gudgeon member 42 with a handle 44.

The stationary channel guide member 34 comprises a substantially horizontal base plate 46 with upstanding side walls 48, 48 having inwardly extending guide flanges 50. The base plate 46 has detent recesses 52 spaced apart along its length as best shown in FIGS. 2 and 4, and is mounted on the top of the seat post 24 as by welding at 54.

As best shown in FIGS. 2 and 5, the slide member 36 has a substantially horizontal base plate 56 with external grooves 58 along opposite edges. These are slidably engaged with the inwardly extending guide flanges 50 for lengthwise slidable movement along the channel guide 34. The latter has stop means at opposite ends, namely, an upturned rear tab 60 and a rivet or screw 62 at the front end for limiting movement of slide member 36 in opposite directions.

The slide member 36 has an intermediate, upstanding section 64 with intersecting vertical and horizontal bores 66 and 68, respectively, and a transverse bolt hole 70.

One of many conventional saddles 22 is shown. This comprises an inner, plastics frame 72 and an outer layer of elastic cushioning material 74. As best shown in FIGS. 2 and 3, the plastics frame includes a pair of transverse ribs 74, 76 having lower convex edges 78, 80, respectively, and a pair of longitudinal ribs 82, 82 (FIG. 3). The intermediate section 64 is of a suitable width to fit snugly between the ribs 82,82, as shown in FIG. 3. A transverse, fulcrum bolt 84 extends between the ribs 82, through the bolt hole 70, and acts as a pivot about which the saddle 22 can be tilted for a desired angular adjustment.

At opposite ends, the slide member 36 has screw-threaded threaded openings 86 for tilt-adjusting jack screws 88,88. After tilting the saddle 22 to a desired angular adjustment about fulcrum bolt 84, the jack screws 88,88 will be adjusted upwardly until their heads bear against the convex edges 78 and 80. Locknuts 90 will then be tightened to "freeze" the saddle in the angular position so selected.

As best shown in FIG. 2, the vertical bore 66 is blind, being closed at the top and open at the bottom. The latch pin 38 is guided within the vertical bore 66 for vertical movement to and from a locked position in which its lower, reduced-diameter end portion 92 is engaged within a selected one of the detent recesses 52 in the channel guide baseplate 46. This locks the slide member 36 and the saddle 22 stably against fore and aft movement from a selected longitudinally adjusted position. The coil spring 40 is compressibly interposed between the latch pin 38 and the upper, closed end wall of bore 66 to bias or urge the latch pin in a downward direction. The latch pin is generally cylindrical and has a side groove 94 defining an upper shoulder 96.

The gudgeon member 42 has an annular cross section and is rotatably journaled in the horizontal bore 68. As best shown in FIG. 3, it has an axial length sufficient to fit snugly between the inwardly extending flanges 50,50 to limit end play. The external handle 44 is fastened as by soldering, brazing or a force fit, into the central bore 98 of the gudgeon member 42. Referring to FIGS. 2, 13 and 14, the gudgeon member has a groove 100 with an upwardly facing lower ledge 102.

Because of the intersection of bores 66 and 68, the gudgeon groove 100 intersects with latch pin side groove 94 enabling the gudgeon lower ledge 102 to displace the latch pin shoulder 96 upwardly and thereby disengage and unlock the latch pin extension 92 from any detent recess 52 in response to counter-clockwise rotation of the gudgeon by the handle 44.

Use and operation are believed to be apparent in view of the above description. Briefly, to change the longitudinal position of the saddle 22 from that shown in FIGS. 1 and 2, the handle 44 is lifted to disengage the latch pin 38 from detent recess 52. The slide member 36 and the saddle 22 carried thereby may then be moved forwardly or rearwardly and the handle will be released to engage the latch pin with another detent recess 52.

The embodiment described and shown to illustrate the present invention has been necessarily specific for purposes of illustration. Alterations, extensions, and modifications would be apparent to those skilled in the art. The aim of the appended claims, therefore, is to cover all variations included within the spirit and scope of the invention.

The embodiments of the invention in which an exclusive property or privilege is claimed are defined as follows:

1. In a cycle-type apparatus having a saddle supported on a seat post, a longitudinally adjustable mounting comprising:
   a stationary, elongated, horizontal guide member mounted on the seat post;
   detent means spaced apart longitudinally along the guide member;
   a slide member having saddle mounting means thereon and being moveable along the guide member;
   a latch member on the slide member for movement to and from a locked position engaged with a selected portion of the detent means to lock the slide member and saddle mounting means in a selected longitudinal position along the guide member;
   a gudgeon member separate from the latch member rotatably journaled in the slide member and having an external handle for rotating same; and
   means interengaging the gudgeon member and the latch member for moving the latch member from the locked position to thereby release the latch member from the detent means to enable longitudinal adjustment of the saddle mounting means with the slide member along the guide member.

2. In a cycle-type apparatus having a saddle supported on a seat post, a longitudinally adjustable mounting comprising:
   a stationary, elongated guide member mounted on the seat post;
   a slide member having means for mounting and tiltably adjusting a saddle thereon;
   guide means acting between the slide member and the guide member comprising mutually engageable surfaces on the slide and guide members effective to guide the slide member for movement lengthwise along the guide member;
   detent means longitudinally spaced apart along the length of the guide member;
   a gudgeon member rotatably journaled in the slide member and having an external handle for rotating same;
   a latch member separate from the gudgeon member and mounted on the slide member for movement to and from a locked position engaged with a selected portion of the detent means to lock the slide member and saddle in a selected longitudinal position;
   means biasing the latch member toward its locked position; and
   means interengaging the gudgeon member and the latch member for releasing the latch member from the detent means in response to rotation of the gudgeon member to enable longitudinal adjustment of the slide member along the guide member.

3. In a cycle-type apparatus having a saddle supported on a seat post, a longitudinally adjustable mounting comprising:
   a stationary, elongated guide plate mounted on the seat post and having a pair of longitudinally extending guide surfaces thereon;
   a slide member having a horizontal base plate with a pair of longitudinally extending guide surfaces thereon engageable with the guide surfaces on the guide plate for guiding the slide member for lengthwise movement along the guide plate;
   said slide member having an intermediate, upstanding section with means for pivotally mounting a saddle, and having tilt-adjusting bolt means on fore and aft ends of the base plate to adjust and hold a saddle in a selected tilted position;
   detent means longitudinally spaced apart along the length of the guide plate;
   a latch member separate from the gudgeon member and mounted on the slide member for movement to and from a locked position engaged with a selected portion of the detent means to lock the slide member in a selected longitudinal position;
   means biasing the latch member toward the locked position;
   a gudgeon member rotatably journaled in the slide member and having an external handle for rotating same; and
   means interengaging the gudgeon member and the latch member for releasing the latch member from the detent means in response to rotation of the gudgeon member to enable longitudinal adjustment of the slide member along the guide plate.

4. In a cycle-type apparatus having a saddle supported on a seat post, a longitudinally adjustable mounting including:
   a stationary, elongated channel guide comprising a substantially horizontal base plate with upstanding sidewalls having inwardly extending guide flanges, said base plate having detent recesses horizontally spaced apart along the length thereof and being mounted on the seat post;

an elongated slide member comprising a substantially horizontal base plate having external grooves along opposite edges slidably engaged with said guide flanges for lengthwise adjustable movement along the channel guide;

said slide member also comprising an intermediate, upstanding section with intersecting vertical and horizontal bores;

a latch pin in the vertical bore guided for up and down movement toward and away from a locked position engaging a selected one of the detent recesses;

a gudgeon member rotatably journaled in the horizontal bore and having an external handle for rotating same; and means interengaging the gudgeon member and the latch pin for moving the latch pin away from said locked position in response to rotation of the gudgeon member by the handle.

5. In a cycle-type apparatus, a longitudinally adjustable mounting according to claim 4 in which the inwardly extending guide flanges of the channel guide overlie opposite ends of the horizontal bore to limit end play of the gudgeon member.

6. In a cycle-type apparatus, a longitudinally adjustable mounting according to claim 5 in which the horizontal space between the inwardly extending guide flanges is only slightly greater than the axial length of the gudgeon member to limit excessive endwise movement of the gudgeon member.

7. In a cycle-type apparatus, a longitudinally adjustable mounting according to claim 4 having means on the intermediate, upstanding section of the slide member to fasten a saddle for adjustable movement therewith.

8. In a cycle-type apparatus, a longitudinally adjustable mounting according to claim 7 in which said means for fastening a saddle includes a bolt hole extending transversely through the intermediate, upstanding section.

9. In a cycle-type apparatus, a longitudinally adjustable mounting according to claim 4 including stop means at opposite ends of the base plate to limit movement of the slide member.

10. In a cycle-type apparatus, a longitudinally adjustable mounting according to claim 4 including spring means within the vertical bore biasing the latch pin toward its said locked position.

11. In a cycle-type apparatus, a longitudinally adjustable mounting according to claim 4 in which the means interengaging the gudgeon member and the latch pin comprises interengaging shoulders on the gudgeon member and latch pin.

* * * * *